United States Patent
Zoellner et al.

(10) Patent No.: US 10,919,482 B1
(45) Date of Patent: Feb. 16, 2021

(54) AIRBAG-BASED OCCUPANT SAFETY SYSTEM

(71) Applicants: Alexander M. Zoellner, Mountain View, CA (US); Jorge C. Fialho, San Jose, CA (US); Nathaniel J. Dennis, Cupertino, CA (US); Rikard Fredriksson, San Jose, CA (US)

(72) Inventors: Alexander M. Zoellner, Mountain View, CA (US); Jorge C. Fialho, San Jose, CA (US); Nathaniel J. Dennis, Cupertino, CA (US); Rikard Fredriksson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/877,841

(22) Filed: May 19, 2020

Related U.S. Application Data

(63) Continuation of application No. 15/935,372, filed on Mar. 26, 2018, now Pat. No. 10,661,748.

(60) Provisional application No. 62/487,779, filed on Apr. 20, 2017.

(51) Int. Cl.
| | |
|---|---|
| *B60R 21/16* | (2006.01) |
| *B60R 21/233* | (2006.01) |
| *B60R 21/213* | (2011.01) |
| *B60R 21/239* | (2006.01) |
| *B60R 21/0134* | (2006.01) |
| *B60R 21/21* | (2011.01) |
| *B60R 21/231* | (2011.01) |

(52) U.S. Cl.
CPC ........ *B60R 21/233* (2013.01); *B60R 21/0134* (2013.01); *B60R 21/164* (2013.01); *B60R 21/21* (2013.01); *B60R 21/213* (2013.01); *B60R 21/239* (2013.01); *B60R 21/23138* (2013.01); *B60R 2021/23107* (2013.01)

(58) Field of Classification Search
CPC .......... B60R 21/232; B60R 2021/2615; B60R 2021/23332
USPC ...................... 280/730.1, 730.2, 743.1, 743.2
See application file for complete search history.

(56) References Cited

U.S. PATENT DOCUMENTS

| | | | |
|---|---|---|---|
| 5,072,966 A | 12/1991 | Nishitake et al. | |
| 5,957,493 A | 9/1999 | Larsen et al. | |
| 6,106,000 A | 8/2000 | Stewart | |
| 7,690,684 B2 | 4/2010 | Tobaru et al. | |
| 7,806,221 B2 | 10/2010 | Mishra | |
| 8,474,865 B2* | 7/2013 | Grindle | B60R 21/213 280/730.2 |
| 9,022,417 B2 | 5/2015 | Breed | |
| 9,566,929 B1* | 2/2017 | Belwafa | B60R 21/23138 |
| 9,610,915 B2* | 4/2017 | Specht | B60R 21/214 |

(Continued)

FOREIGN PATENT DOCUMENTS

CN 102414050 B 11/2014

*Primary Examiner* — Toan C To
(74) *Attorney, Agent, or Firm* — Young Basile Hanlon & MacFarlane, P.C.

(57) ABSTRACT

Occupant safety systems suitable for use in both traditional and opposed seating systems include various combinations of passive safety components: sensors that provide an output signal indicative of an imminent collision, inflatable restraints that deploy from opposing interior surfaces of a passenger compartment of a vehicle based on the output signal, and inflators disposed within door cavities that selectively inflate an airbag or vent the inflator to an exterior of a vehicle based on the output signal.

20 Claims, 10 Drawing Sheets

(56) References Cited

U.S. PATENT DOCUMENTS

| | | |
|---|---|---|
| 10,279,770 B2 | 5/2019 | Faruque et al. |
| 10,315,609 B2 * | 6/2019 | Thomas ................ B60R 21/232 |
| 10,336,279 B2 * | 7/2019 | Farooq ................. B60R 21/205 |
| 10,343,642 B2 | 7/2019 | Faruque et al. |
| 2006/0043712 A1 | 3/2006 | Hakki et al. |
| 2006/0097492 A1 | 5/2006 | Bakhsh et al. |
| 2014/0097601 A1 | 4/2014 | Fukawatase et al. |
| 2015/0158452 A1 * | 6/2015 | Choi .................... B60R 21/231 280/732 |
| 2015/0197209 A1 | 7/2015 | Fujiwara |
| 2016/0297393 A1 * | 10/2016 | Fukawatase .......... B60R 21/231 |
| 2017/0267204 A1 | 9/2017 | Farooq et al. |
| 2017/0361802 A1 | 12/2017 | Farooq et al. |
| 2019/0161045 A1 * | 5/2019 | Thomas .............. B60R 21/2338 |

\* cited by examiner

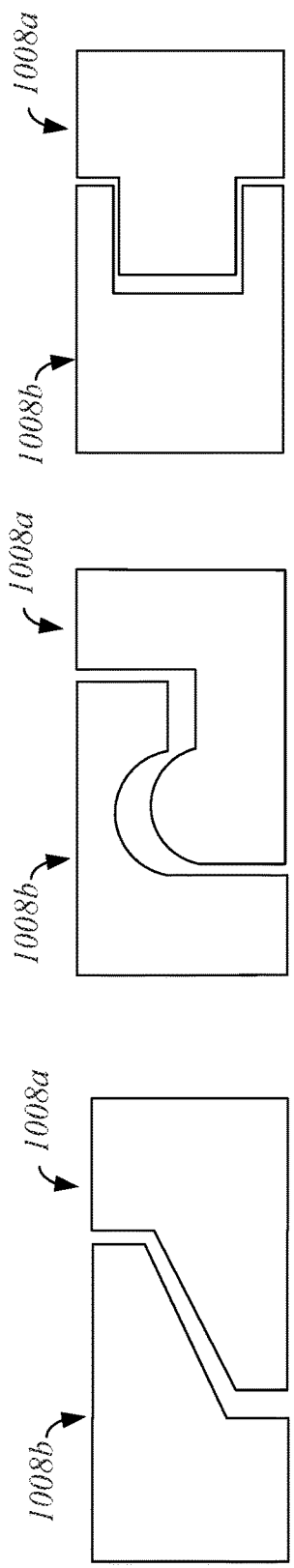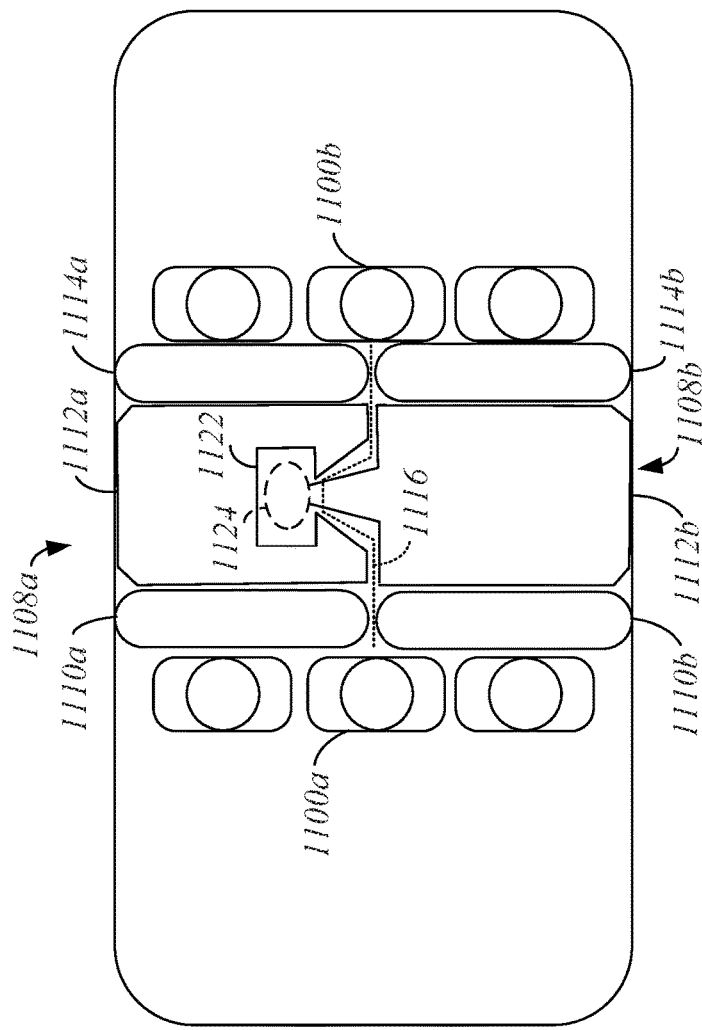

AIRBAG-BASED OCCUPANT SAFETY SYSTEM

CROSS-REFERENCE TO RELATED APPLICATIONS

This application is a continuation of U.S. patent application Ser. No. 15/935,372, filed Mar. 26, 2018, entitled "Airbag-Based Occupant Safety Systems," and claims the benefit of U.S. Provisional Application No. 62/487,779, filed on Apr. 20, 2017, entitled "Airbag-Based Occupant Safety Systems," the content of which is incorporated herein by reference in its entirety.

FIELD

The application relates generally to occupant safety systems for vehicles that include airbags. More particularly, described embodiments relate to cross-cabin airbags, vehicle exterior airbags, and directed airbag deployment for passenger compartments with opposed or traditional seating.

BACKGROUND

Existing occupant safety systems for traditional, one- two- or three-row vehicles, such as restraints including seatbelts and airbags, can reduce the risk of injury during a collision. Vehicular airbags often use interior components such as dash panels, roof rails, and steering wheels both for packaging purposes and to provide reaction surfaces to interact with the airbags to produce the necessary reaction force. In the absence of adequate reaction surfaces or tethers, airbags may deflect too much to adequately protect an occupant during a collision.

In non-traditional vehicle designs, for example, where rows of occupants face each other within the passenger compartment or where the vehicle is designed without roof rails, there are limited options for reaction surfaces and tethers. New approaches to airbag-based occupant safety systems are thus desired.

SUMMARY

One aspect of the disclosed embodiments is an occupant safety system. The occupant safety system includes a sensor that provides an output signal indicative of an imminent collision and a pair of inflatable restraints. The inflatable restraints deploy from opposing interior surfaces of a passenger compartment of a vehicle based on the output signal. The inflatable restraints each include a central chamber and a pair of outer chambers. The outer chambers extend along opposing side surfaces of the central chamber upon deployment, and the central chamber has a first pressure and the outer chambers have a second pressure. The central chambers and the outer chambers of the pair of inflatable restraints meet along an interface region within the passenger compartment.

Another aspect of the disclosed embodiments is an occupant safety system. The occupant safety system includes a sensor that provides an output signal indicative of an imminent collision, a first inflatable restraint that deploys from a first interior surface of a passenger vehicle in response to the output signal, and a second inflatable restraint that deploys from a second interior surface of the passenger vehicle in response to the output signal. An interface structure is defined on one or both of the first inflatable restraint and the second inflatable restraint to restrain motion of the first inflatable restraint relative to the second inflatable restraint when the first inflatable restraint and the second inflatable restraint are deployed.

Another aspect of the disclosed embodiments is an occupant safety system. The occupant safety system includes a sensor that provides an output signal indicative of an imminent collision and an inflator that selectively inflates an airbag or vents to an exterior of a vehicle based on the output signal. The inflator is disposed within a cavity of a door of a vehicle.

BRIEF DESCRIPTION OF THE DRAWINGS

FIGS. 10A, 10B, and 10C show cross-sectional examples through the cross-cabin airbags of FIG. 9.
FIG. 11 shows another top-view pre-collision diagram using cross-cabin airbags as part of an occupant safety system for use in an opposed seating system.

DETAILED DESCRIPTION

This disclosure relates to advances in occupant safety systems suitable for use in non-traditional vehicles, such as vehicles including opposed seating systems and lacking traditional airbag packaging and reaction surfaces such as dash panels, steering wheels, and roof rails. Improved occupant safety systems include inflatable restraints such as cross-cabin airbags that increase safety during a collision for occupants facing each other in an opposed seating configuration. Improved occupant safety systems also include door-based inflators serving multiple airbags or single airbags with multiple deployment direction capabilities. The use of these safety features allows for increased options in packaging and design in all vehicle passenger compartments regardless of cabin and seating configurations.

Figure 1A:
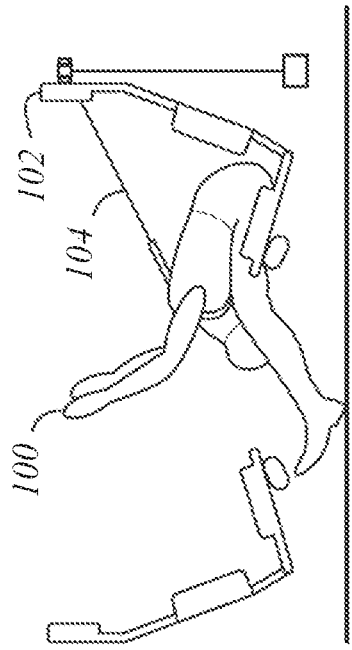
FIGS. 1A and 1B show a motion diagram of a collision.
Figure 1B:
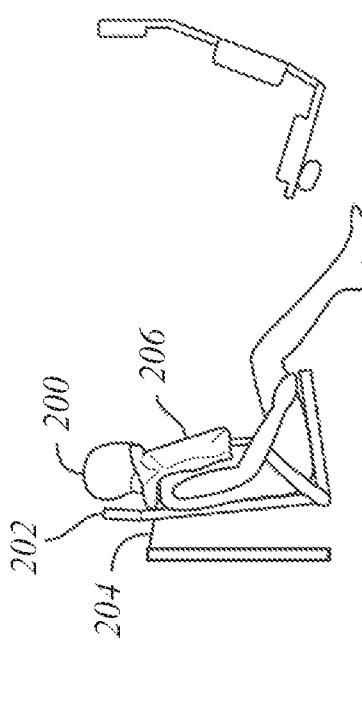

FIGS. 1A and 1B show a motion diagram of a collision in an opposed seating system. The front of the vehicle (not shown) including the opposed seating system is on the left, and the vehicle is moving to the left. In FIG. 1A, pre-collision, an occupant 100 is restrained in a front-facing seat 102 using a tensioned restraint 104, and the tensioned restraint 104 includes a lap portion and a shoulder portion securing the occupant 100 to the front-facing seat 102. In this example, the tensioned restraint 104 can be a seatbelt or a lapbelt. In FIG. 1B, during a front-end, forward motion collision occurring on a left side of the diagram, the occupant 100 is bent forward into the open space of the passenger compartment, greatly extending the tensioned restraint 104, for example, should a locking mechanism for the tensioned restraint 104 not engage. There is a risk of injury to the occupant 100, for example, based on a head of the occupant 100 hitting knees of the occupant 100. In this example, and in other examples described herein, similar forces may be experienced by passengers in other seating positions for other collision types. In the example of FIGS. 1A-1B, similar forces would be experienced by rear-facing passengers during a rear-end collision.

Figure 2A:
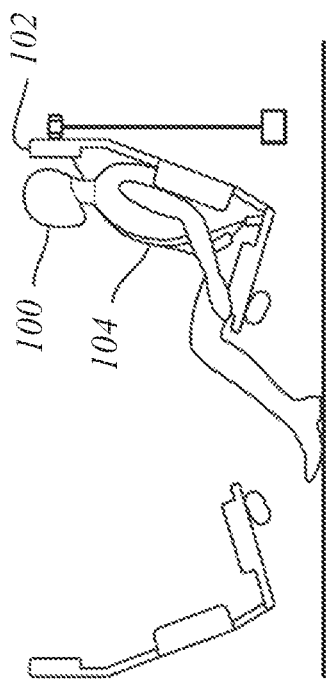
FIGS. 2A and 2B show another motion diagram of a collision.
Figure 2B:
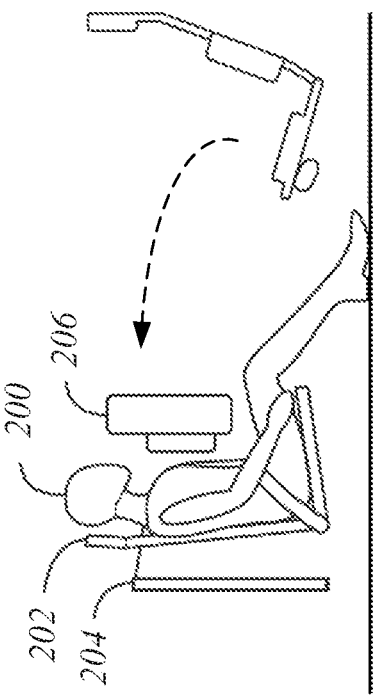

FIGS. 2A and 2B show another motion diagram of a collision. The collision of FIGS. 2A and 2B can also occur in an opposed seating system as shown. The front of the vehicle (not shown) is on the left, and the vehicle is moving to the left. In FIG. 2A, during a collision where a tensioned restraint 204 holds an occupant 200 against a rear-facing seat 202, a loose object 206, in this example, a backpack, can be launched toward the occupant 200 from, for example, its position on the opposed seat row as indicated by a dotted-line arrow. In FIG. 2B, at a later time during the collision than in FIG. 2A, the loose object 206 can impact the occupant 200, potentially causing an injury to the occupant 200. A similar loose object scenario is presented for a front-facing passenger during a rear-end collision for an object located on a rear facing seat. Various occupant safety system components are described below that can reduce or eliminate the potential injuries to the occupants 100, 200 that are possible in the scenarios described by the collision motion diagrams of FIGS. 1A, 1B, 2A, and 2B.

Figure 3A:
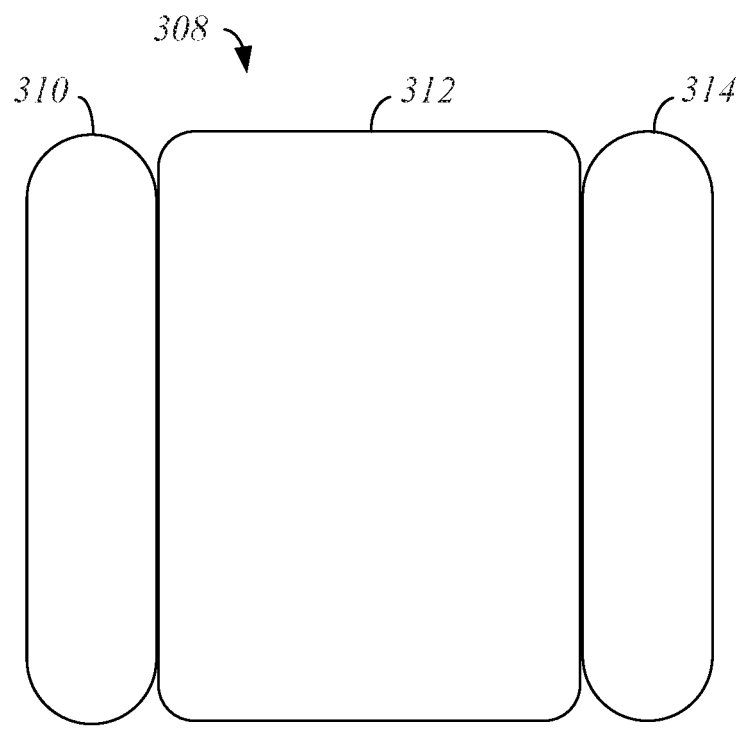
FIGS. 3A and 3B show construction examples for a cross-cabin airbag.

FIG. 3A shows a top view of a construction example for a cross-cabin airbag 308, for example, deployable from a door, a belt line, or a roof rail of vehicle (not shown) to extend in front of one or more occupants such as the occupant 100 of FIGS. 1A and 1B. In the example of FIG. 3A, the cross-cabin airbag 308 is divided into three chambers 310, 312, 314. The outer chambers 310, 314 can be coupled to the central chamber 312, for example, using a common panel or through stitching or tethering. The outer chambers 310, 314 can be in fluid communication with the central chamber 312 and use a common inflation source. The outer chambers 310, 314 can be isolated from the central chamber 312 and use separate inflation sources.

The outer chambers 310, 314 can have an inflatable construction of lower pressure, that is, a pressure causing a lower stiffness, while the central chamber 312 can have a drop-stitch construction and a higher pressure, that is, a pressure causing a higher stiffness, to act as a reaction surface. The difference in pressure and/or stiffness can be achieved by using a high-pressure structural airbag for the central chamber 312 and softer, lower pressure airbags for the outer chambers 310, 314. For example, the central chamber 312 can have a pressure at least two times or twice a pressure of the outer chambers 310, 314. In other examples, the central chamber 312 may have a pressure equal to a pressure of the outer chambers 310, 314, though stiffness may differ. During deployment, the outer chambers 314 can extend along opposing side surfaces of the central chamber 312 as shown.

Figure 3B:
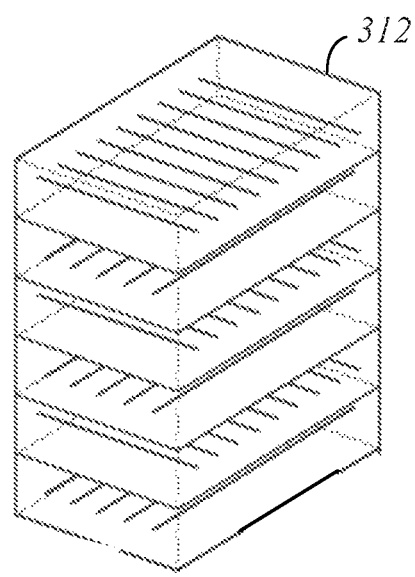

FIG. 3B shows a perspective view of internal detail for one construction example of the central chamber 312 of the cross-cabin airbag 308 of FIG. 3A. Layers of fabric can stiffen and stabilize the central chamber 312 of the cross-cabin airbag 308 during deployment as shown. For example, inflated drop-stitch fabrics have a high overall stiffness including a high bending stiffness based on using both higher pressures and spaced apart layers of fabric connected to one another by a large number of threads extending between the layers. Drop-stitch materials are also used in stand-up paddle boards, air mattresses, or kayak floors given the high overall stiffness and high bending stiffness.

Use of high-pressure inflation and drop-stitch construction within the central chamber 312 for the cross-cabin airbag 308 allows for a stiff, self-tethered airbag that acts as a reaction surface. In other words, a layered central chamber 312 of a higher pressure can provide the necessary stiffness so the lower pressure, lower stiffness airbags forming the outer chambers 310, 314 maintain position during a collision. Other embodiments of the cross-cabin airbag 308 (not shown) can include: a cross-cabin airbag having a central chamber and outer chambers of equal pressure and equal or different stiffness, an open-faced sandwich version of a cross-cabin airbag with two chambers, one of higher pressure and one of lower pressure, and a single-chamber cross-cabin airbag with frames of drop-stitch fabric and intermediate pressure and/or stiffness.

The cross-cabin airbag 308 of FIGS. 3A and 3B can provide protection to the head, the torso, and the legs of an occupant during a collision when the occupant impacts one of the outer chambers 310, 314. The cross-cabin airbag 308 can also provide protection during a collision to the head and torso of an occupant when loose objects, such as the loose object 206 shown in FIGS. 2A and 2B, impact an opposing one of the outer chambers 310, 314 to that impacted by the occupant based on a position of the loose object in an opposing seat to the occupant prior to the collision.

Figure 4:
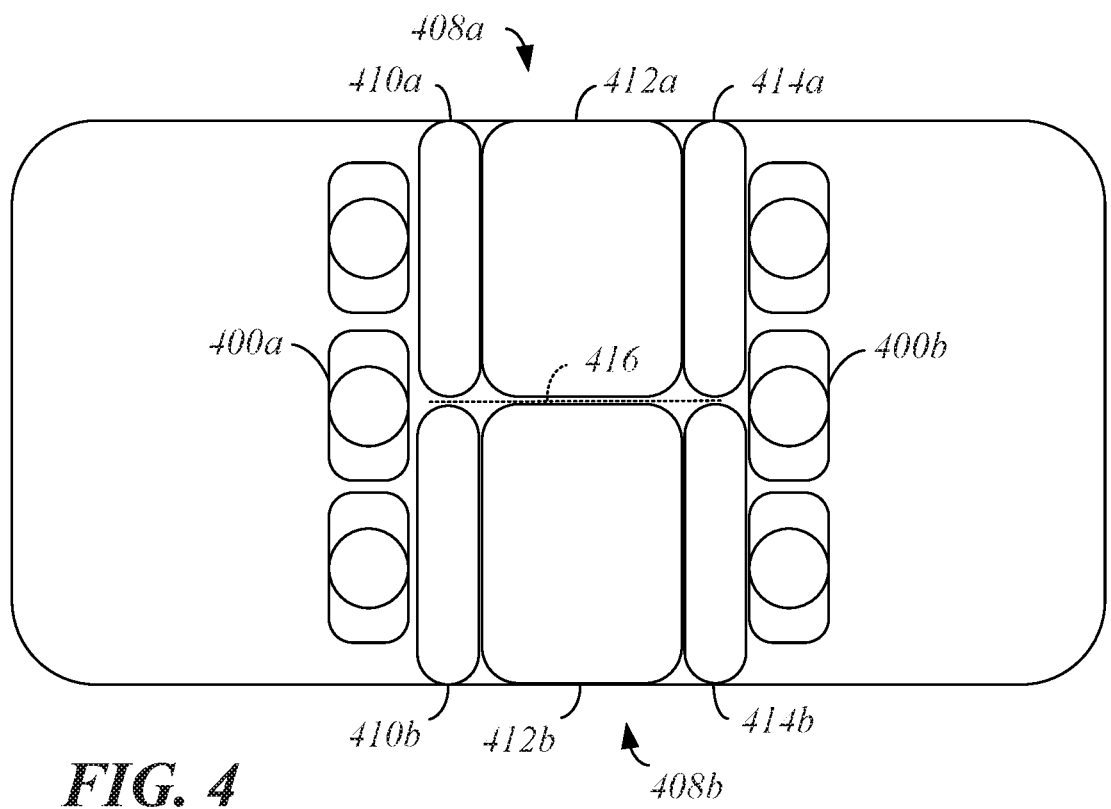
FIG. 4 shows a top-view pre-collision diagram using cross-cabin airbags as part of an occupant safety system for use in an opposed seating system.

FIG. 4 shows a top-view pre-collision diagram using cross-cabin airbags 408a, 408b as part of an occupant safety system for use in an opposed seating system (not shown). The front of the vehicle including the opposed seating system is on the left, and the vehicle is moving to the left. Three occupants, including a center occupant 400a, are restrained in a rear-facing seats (not shown). Three more occupants, including another center occupant 400b, are restrained in front-facing seats (not shown). Though a total of six occupants are shown, that is, two opposed seating rows hold three occupant each, only the center occupants 400a, 400b are labeled for simplicity of description. The number of seated occupants may also vary from zero to six in the passenger compartment of FIG. 4. In the shown example, the center occupants 400a, 400b face each other at a central location within the passenger compartment.

Each of the cross-cabin airbags 408a, 408b includes three chambers, two outer chambers 410a or 410b, 414a or 414b and a central chamber 412a or 412b. The construction of the outer chambers 410a, 410b, 414a, 414b and the central chambers 412a, 412b can be similar to that described for the outer chambers 310, 314 and the central chamber 312 of the cross-cabin airbag 308 of FIG. 3A. That is, the outer chambers 410a, 410b, 414a, 414b can have a lower pressure and/or stiffness, and the central chambers 412a, 412b can have a higher pressure and/or stiffness than that of the outer chambers 410a, 410b, 414a, 414b.

The cross-cabin airbags 408a, 408b can be mounted on opposing interior surfaces of a passenger compartment of a vehicle (not shown). For example, the cross-cabin airbags 408a, 408b can be mounted within opposing door panels, opposing belt lines, or opposing roof rails (not shown) along an outer perimeter of the passenger compartment and deployed in a manner that positions the cross-cabin airbags 408a, 408b between the two rows of occupants. Deployment of the cross-cabin airbags 408a, 408b can be based on a sensor (not shown) sending a controller (not shown) an output signal indicative of an imminent collision. Deployment can be such that the outer chambers 410a, 410b, 414a, 414b extend along side surfaces of the respective central chambers 412a, 412b as shown.

The cross-cabin airbags 408a, 408b can extend or inflate such that outer surfaces of the cross-cabin airbags 408a, 408b meet between the center occupants 400a, 400b along an interface region 416 designated in dotted line. The term "interface region" is used to indicate the location where the first in a pair of cross-cabin airbags touches, couples, meets, hooks, or otherwise interfaces with the second in a pair of cross-cabin airbags in order to form a more singular or united cross-cabin airbag that extends across the entire passenger compartment. In particular, structures (i.e., "interface structures") may be defined on one or both of the cross-cabin airbags 408a, 408b to restrain relative motion of the cross-cabins airbags 408a, 408b when deployed.

For the interface region 416 in FIG. 4, an outermost portion of an outer surface of the central chamber 412a can touch or otherwise interface with an outermost portion of an outer surface of the central chamber 412b at a central location within the passenger compartment. Similarly, an outermost portion of an outer surface of the outer chamber 410a can touch or otherwise interface with an outermost portion of an outer surface of the outer chamber 410b at a central location within the passenger compartment. Finally, an outermost portion of an outer surface of the outer chamber 414a can touch or interface with an outermost portion of an outer surface of the outer chamber 414b at a central location within the passenger compartment. Thus, in this example, the interface region 416 is a straight line extending between the center occupants 400a, 400b.

Each of the cross-cabin airbags 408a, 408b shown in FIG. 4 acts independently to protect the occupants, including the center occupants 400a, 400b, during lower-speed and moderate-speed collisions. Optimization of design of the cross-cabin airbags 408a, 408b in a manner that impacts the interface region 416 can further enhance performance of the cross-cabin airbags 408a, 408b during higher-speed collisions and in situations that include a presence of the center occupants 400a, 400b. Additional designs for interface regions to be used with cross-cabin airbags similar to the cross-cabin airbags 408a, 408b of FIG. 4 are further described below.

Figure 5:
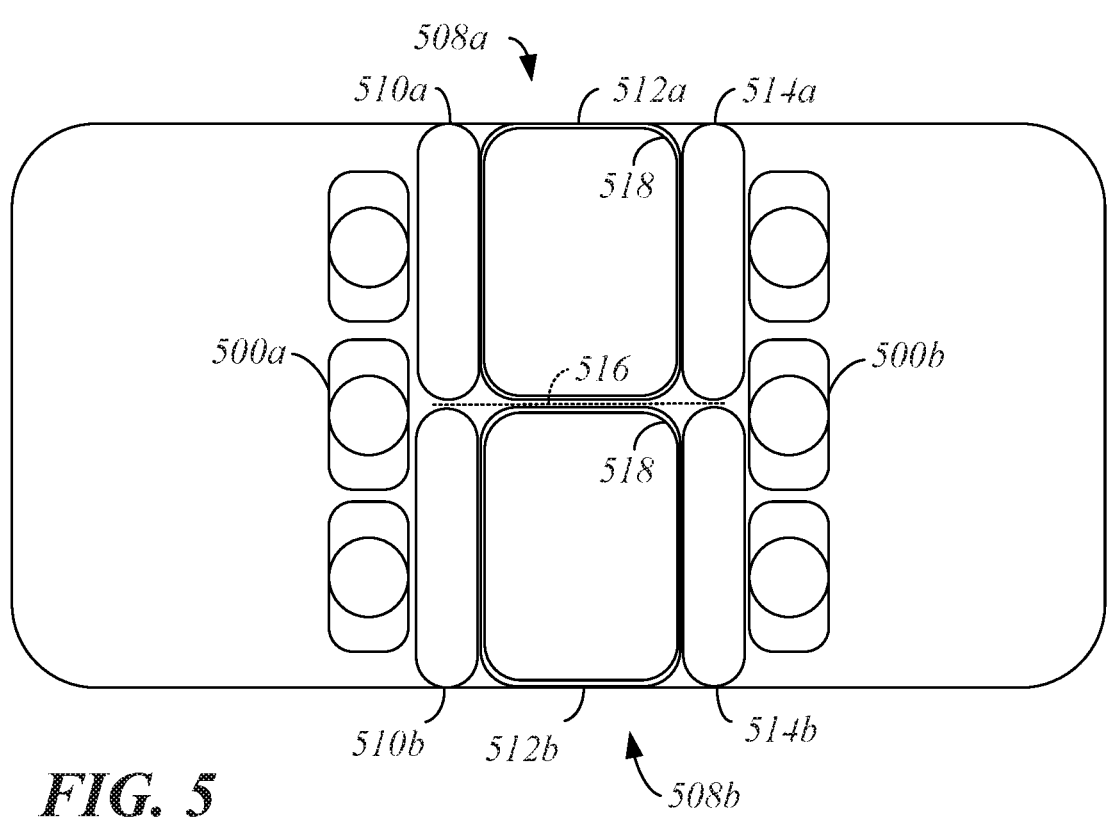
FIG. 5 shows another top-view pre-collision diagram using cross-cabin airbags as part of an occupant safety system for use in an opposed seating system.

FIG. 5 shows another top-view pre-collision diagram using cross-cabin airbags 508a, 508b as part of an occupant safety system for use in an opposed seating system. The front of the vehicle including the opposed seating system is on the left, and the vehicle is moving to the left. Three occupants, including a center occupant 500a, are restrained in a rear-facing seats (not shown). Three more occupants, including another center occupant 500b, are restrained in front-facing seats (not shown). In the shown example, the center occupants 500a, 500b face each other at a central location within the passenger compartment.

Each of the cross-cabin airbags 508a, 508b includes three chambers, two outer chambers 510a or 510b, 514a or 514b and a central chamber 512a or 512b. The outer chambers 510a, 510b, 514a, 514b can have a lower pressure and/or stiffness, and the central chambers 512a, 512b can have a higher pressure and/or stiffness than that of the outer chambers 510a, 510b, 514a, 514b. The cross-cabin airbags 508a, 508b can be mounted on opposing interior surfaces of a passenger compartment of a vehicle (not shown) and deployed in a manner that positions the cross-cabin airbags 508a, 508b between the two rows of occupants. Deployment of the cross-cabin airbags 508a, 508b can be based on a sensor (not shown) sending a controller (not shown) an output signal indicative of an imminent collision. Deployment can be such that the outer chambers 510a, 510b, 514a, 514b extend along side surfaces of the respective central chambers 512a, 512b as shown.

The cross-cabin airbags 508a, 508b can extend or inflate such that outer surfaces of the cross-cabin airbags 508a, 508b meet between the center occupants 500a, 500b along an interface region 516 designated in dotted line. In the example of FIG. 5, an outermost portion of an outer surface of the central chamber 512a can touch or otherwise interface with an outermost portion of an outer surface of the central chamber 512b at a central location within the passenger compartment. Similarly, an outermost portion of an outer surface of the outer chamber 510a can touch or otherwise interface with an outermost portion of an outer surface of the outer chamber 510b at a central location within the passenger compartment. Finally, an outermost portion of an outer surface of the outer chamber 514a can touch or interface with an outermost portion of an outer surface of the outer chamber 514b at a central location within the passenger compartment. Thus, in this example, the interface region 516 is a straight line extending between the center occupants 500a, 500b.

A strength of connection or strength of coupling of the outer surfaces of the central chambers 512a, 512b along the interface region 516 can be improved, for example, in a matter that prohibits the occupants 500a, 500b from pressing between the cross-cabin airbags 508a, 508b during a collision, by adding or depositing a coating 518 to outside surfaces of the central chambers 512a, 512b. The coating 518 can be silicone-based or formed of any other materials that can increase a friction coefficient along the interface region 516 such that the separate central chambers 512a, 512b are less likely to move or slip along the interface region 516. The coating 518 can also be heat activated. In other words, upon deployment, the coating 518 can be heated in a manner that increases its coefficient of friction. The use of heat activation of the coating 518 allows for easier folding and storage of the cross-cabin airbags 508a, 508b prior to deployment.

The examples shown in FIGS. 6-13 also couple or connect surfaces of inflatable restraints at an interface region to restrain relative motion, using interface structures defined by the geometric configurations of the inflatable restraints, as will be described herein.

Figure 6:
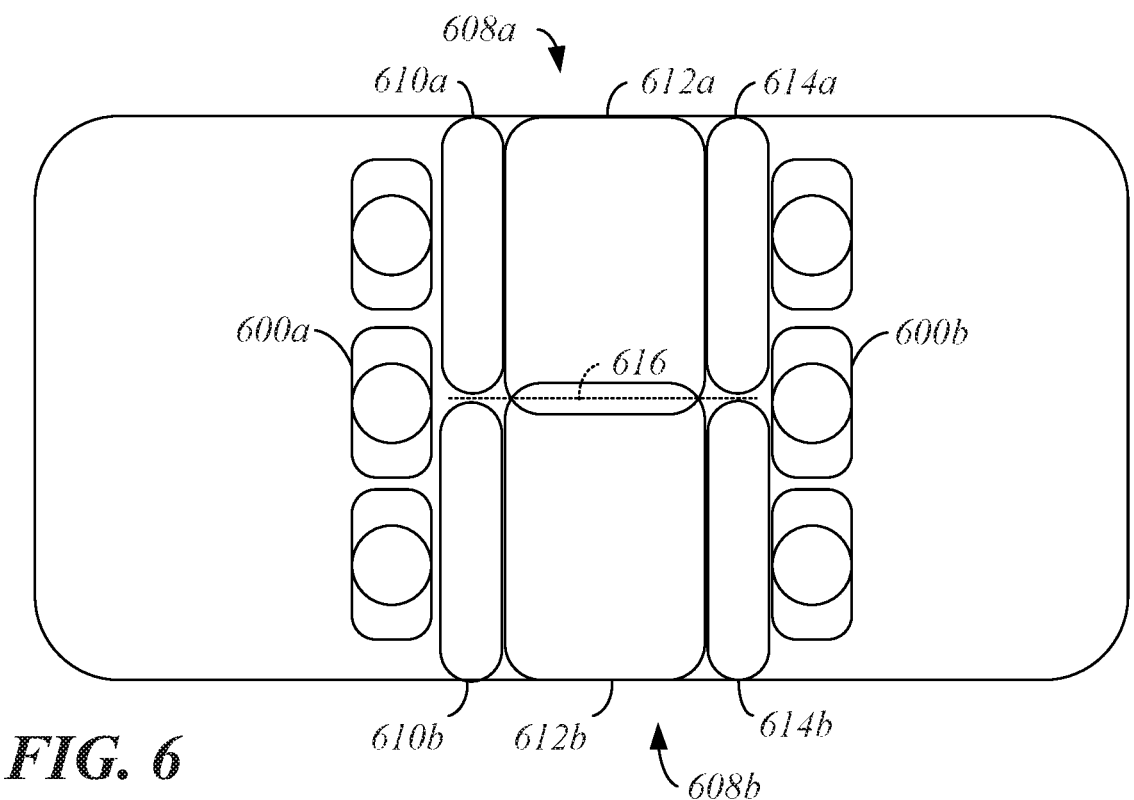
FIG. 6 shows another top-view pre-collision diagram using cross-cabin airbags as part of an occupant safety system for use in an opposed seating system.

FIG. 6 shows another top-view pre-collision diagram using cross-cabin airbags 608a, 608b as part of an occupant safety system for use in an opposed seating system. The front of the vehicle including the opposed seating system is on the left, and the vehicle is moving to the left. Three occupants, including a center occupant 600a, are restrained in a rear-facing seats (not shown). Three more occupants, including another center occupant 600b, are restrained in front-facing seats (not shown). In the shown example, the center occupants 600a, 600b face each other at a central location within the passenger compartment.

Each of the cross-cabin airbags 608a, 608b includes three chambers, two outer chambers 610a or 610b, 614a or 614b and a central chamber 612a or 612b. The outer chambers 610a, 610b, 614a, 614b can have a lower pressure and/or stiffness, and the central chambers 612a, 612b can have a higher pressure and/or stiffness than that of the outer chambers 610a, 610b, 614a, 614b. The cross-cabin airbags 608a, 608b can be mounted on opposing interior surfaces of a passenger compartment of a vehicle (not shown) and deployed in a manner that positions the cross-cabin airbags 608a, 608b between the two rows of occupants. Deployment of the cross-cabin airbags 608a, 608b can be based on a sensor (not shown) sending a controller (not shown) an output signal indicative of an imminent collision. Deployment can be such that the outer chambers 610a, 610b, 614a, 614b extend along side surfaces of the respective central chambers 612a, 612b as shown.

The cross-cabin airbags 608a, 608b can extend or inflate such that outer surfaces of the cross-cabin airbags 608a, 608b meet between the center occupants 600a, 600b along an interface region 616 designated in dotted line. In the example of FIG. 6, an outermost portion of an outer surface of the central chamber 612a can touch or otherwise interface with an outermost portion of an outer surface of the central chamber 612b at a central location within the passenger compartment. Similarly, an outermost portion of an outer surface of the outer chamber 610a can touch or otherwise interface with an outermost portion of an outer surface of the outer chamber 610b at a central location within the passenger compartment. Finally, an outermost portion of an outer surface of the outer chamber 614a can touch or interface with an outermost portion of an outer surface of the outer chamber 614b at a central location within the passenger compartment. Thus, in this example, the interface region 616 is a straight line extending between the center occupants 600a, 600b.

A strength of connection or strength of coupling of the outer surfaces of the central chambers 612a, 612b along the interface region 616 can be improved by sizing the central chambers 612a, 612b such that there is not only an interface or meeting of outer surfaces of the central chambers 612a, 612b upon deployment, but also an overlap along the interface region 616. For example, increasing a volume or capacity of the central chambers 612a, 612b when fully inflated can cause an overlap of the central chambers 612a, 612b such as that shown in FIG. 6. When the central chambers 612a, 612b overlap in this manner, it is difficult for the occupants 600a, 600b to press between the cross-cabin airbags 608a, 608b, increasing the efficiency of the occupant safety system.

Figure 7:
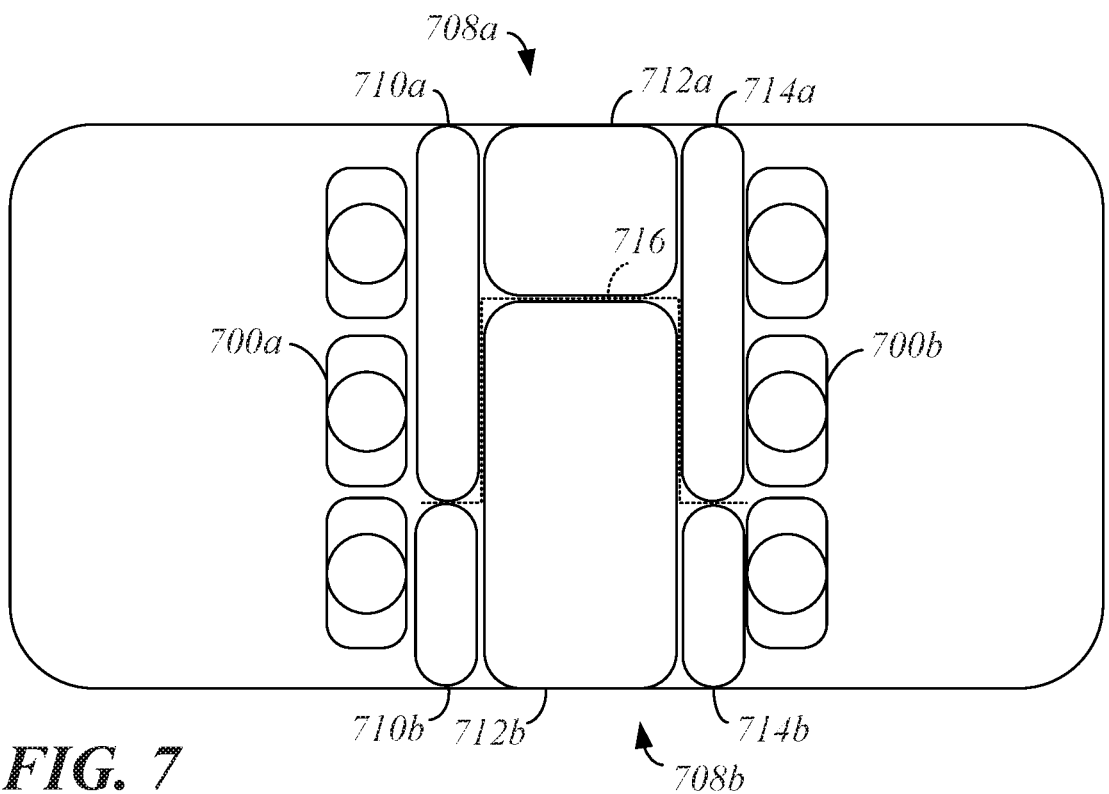
FIG. 7 shows another top-view pre-collision diagram using cross-cabin airbags as part of an occupant safety system for use in an opposed seating system.

FIG. 7 shows another top-view pre-collision diagram using cross-cabin airbags 708a, 708b as part of an occupant safety system for use in an opposed seating system. The front of the vehicle including the opposed seating system is on the left, and the vehicle is moving to the left. Three occupants, including a center occupant 700a, are restrained in a rear-facing seats (not shown). Three more occupants, including another center occupant 700b, are restrained in front-facing seats (not shown). In the shown example, the center occupants 700a, 700b face each other at a central location within the passenger compartment.

Each of the cross-cabin airbags 708a, 708b includes three chambers, two outer chambers 710a or 710b, 714a or 714b and a central chamber 712a or 712b. The outer chambers 710a, 710b, 714a, 714b can have a lower pressure and/or stiffness, and the central chambers 712a, 712b can have a higher pressure and/or stiffness than that of the outer chambers 710a, 710b, 714a, 714b. The cross-cabin airbags 708a, 708b can be mounted on opposing interior surfaces of a passenger compartment of a vehicle (not shown) and deployed in a manner that positions the cross-cabin airbags 708a, 708b between the two rows of occupants. Deployment of the cross-cabin airbags 708a, 708b can be based on a sensor (not shown) sending a controller (not shown) an output signal indicative of an imminent collision. Deployment can be such that the outer chambers 710a, 710b, 714a, 714b extend along side surfaces of the respective central chambers 712a, 712b as shown.

The cross-cabin airbags 708a, 708b can extend or inflate such that outer surfaces of the cross-cabin airbags 708a, 708b meet along an interface region 716 designated in dotted line. In the example of FIG. 7, the central chamber 712a has a volume approximately half of a volume of the central chamber 712b such that an outermost portion of an outer surface of the central chamber 712a can touch or otherwise interface with an outermost portion of an outer surface of the central chamber 712b at a location proximate to first sides of the occupants 700a, 700b, that is, at a location offset from a center of the passenger compartment in a first direction. The outer chambers 710b, 714b can have volumes approximately half of volumes of the outer chambers 710a, 714a such that outermost portions of outer surfaces of the outer chambers 710b, 714b can touch or otherwise interface with outermost portions of outer surfaces of the outer chambers 710a, 714a at a location proximate to second sides of the occupants 700a, 700b, that is, at a location offset from a center of the passenger compartment in a second direction.

The direction of the offsets from the center of the passenger compartment can be generally vertical in reference to FIG. 7, that is, the central chambers 712a, 712b can meet at the interface region 716 nearer to a top of the diagram, and the outer chambers 710a, 710b, 714a, 714b can meet at the interface region 716 nearer to a bottom of the diagram in a manner consistent with the first direction being separated from the second direction by one-hundred-eighty degrees. The opposite is also possible. Based on the offsets described, the interface region 716 is a line with a square-wave shape extending between the first and second sides of the center occupants 700a, 700b with the peak and valley of the square-wave shape being equally offset from the center of the passenger compartment. When the outer chambers 710a, 710b, 714a, 714b and the central chambers 712a, 712b meet along the interface region 716 in this keyed manner, it is difficult for the occupants 700a, 700b to press between the cross-cabin airbags 708a, 708b, increasing the efficiency of the occupant safety system.

Figure 8:
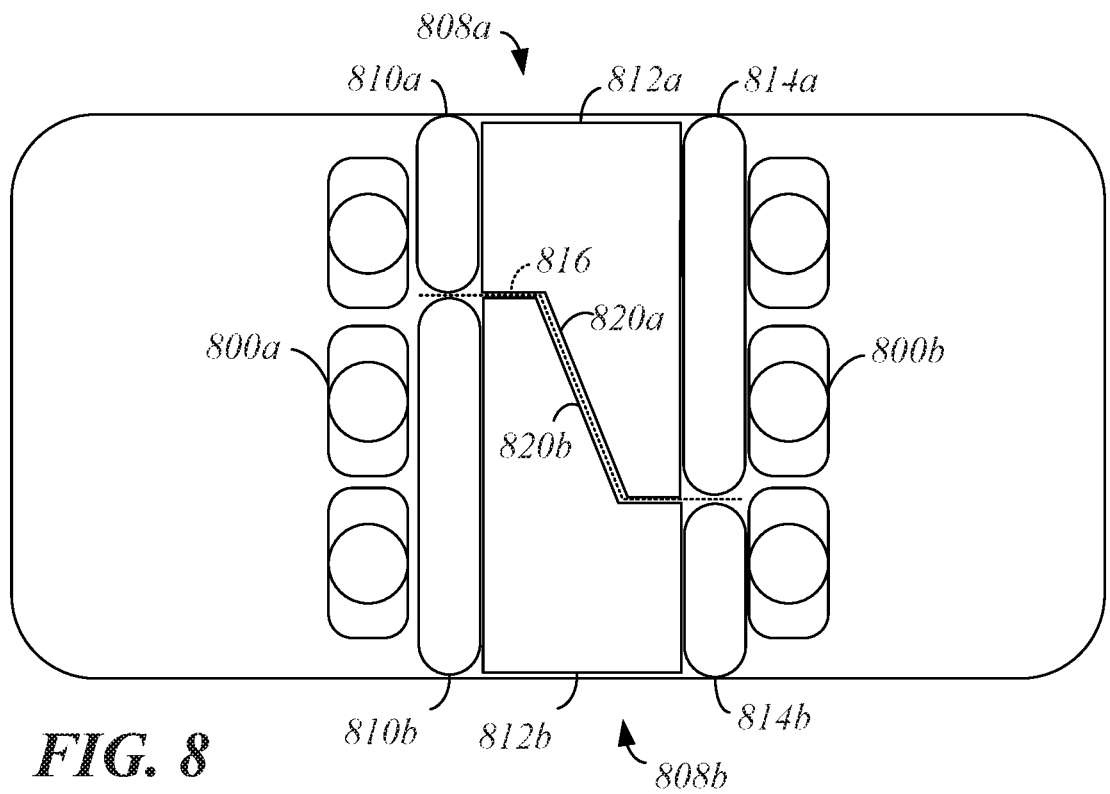
FIG. 8 shows another top-view pre-collision diagram using cross-cabin airbags as part of an occupant safety system for use in an opposed seating system.

FIG. 8 shows another top-view pre-collision diagram using cross-cabin airbags 808a, 808b as part of an occupant safety system for use in an opposed seating system. The front of the vehicle including the opposed seating system is on the left, and the vehicle is moving to the left. Three occupants, including a center occupant 800a, are restrained in a rear-facing seats (not shown). Three more occupants, including another center occupant 800b, are restrained in front-facing seats (not shown). In the shown example, the center occupants 800a, 800b face each other at a central location within the passenger compartment.

Each of the cross-cabin airbags 808a, 808b includes three chambers, two outer chambers 810a or 810b, 814a or 814b and a central chamber 812a or 812b. The outer chambers 810a, 810b, 814a, 814b can have a lower pressure and/or stiffness, and the central chambers 812a, 812b can have a higher pressure and/or stiffness than that of the outer chambers 810a, 810b, 814a, 814b. The cross-cabin airbags 808a, 808b can be mounted on opposing interior surfaces of a passenger compartment of a vehicle (not shown) and deployed in a manner that positions the cross-cabin airbags 808a, 808b between the two rows of occupants. Deployment of the cross-cabin airbags 808a, 808b can be based on a sensor (not shown) sending a controller (not shown) an output signal indicative of an imminent collision. Deployment can be such that the outer chambers 810a, 810b, 814a, 814b extend along side surfaces of the respective central chambers 812a, 812b as shown.

The cross-cabin airbags 808a, 808b can extend or inflate such that outer surfaces of the cross-cabin airbags 808a, 808b meet along an interface region 816 designated in dotted line. In the example of FIG. 8, the central chambers 812a, 812b are designed to meet in a keyed relationship along the interface region 816. Here, the keyed relationship is such that an angled face 820a on an outer surface of the central chamber 812a is fitted to an opposing angled face 820b on an outer surface of the central chamber 812b. The angled faces 820a, 820b are formed by using different lengths for opposing sides of the central chambers 812a, 812b such that each of the central chambers 812a, 812b has a triangular-shaped protrusion with the angled faces 820a, 820b meeting along the interface region 816. This design also includes the outer chambers 810a, 810b, 814a, 814b having different lengths as shown. When the outer chambers 810a, 810b, 814a, 814b and the central chambers 812a, 812b meet along the interface region 816 in this staggered manner, it is difficult for the occupants 800a, 800b to press between the cross-cabin airbags 808a, 808b, increasing the efficiency of the occupant safety system.

Figure 9:
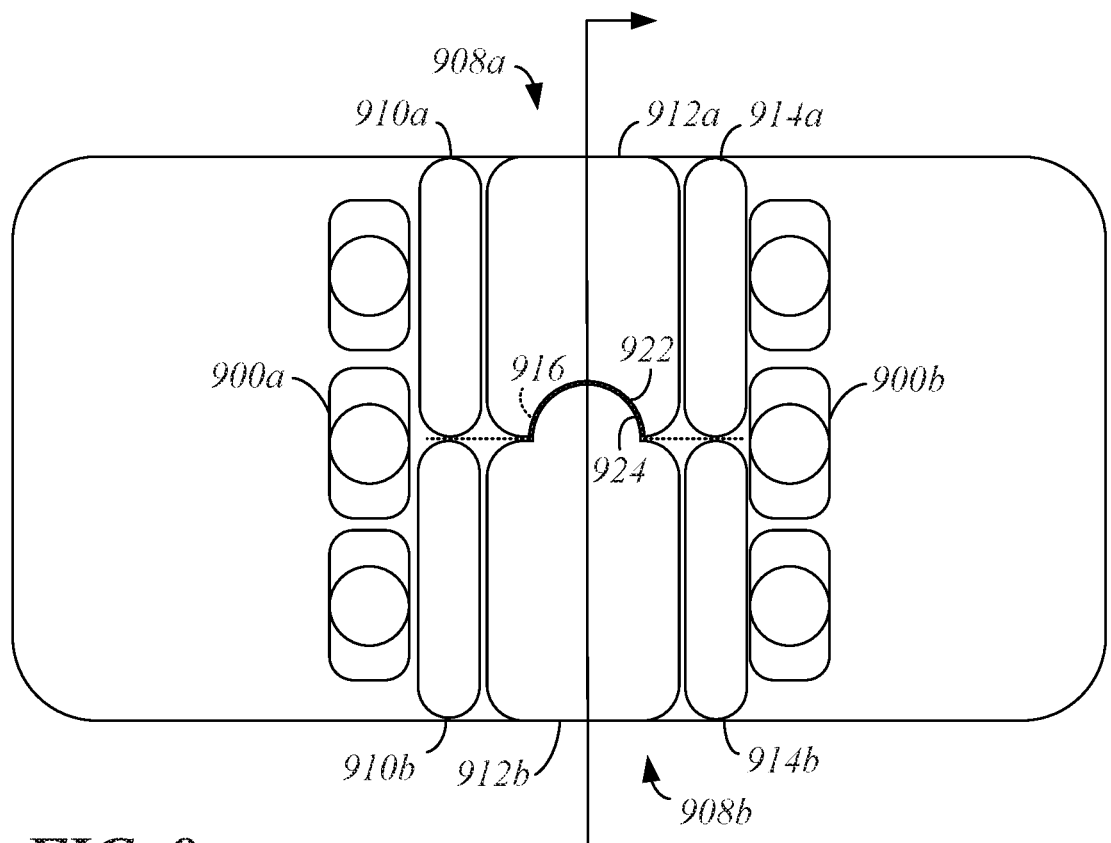
FIG. 9 shows another top-view pre-collision diagram using cross-cabin airbags as part of an occupant safety system for use in an opposed seating system.

FIG. 9 shows another top-view pre-collision diagram using cross-cabin airbags 908a, 908b as part of an occupant safety system for use in an opposed seating system. The front of the vehicle including the opposed seating system is on the left, and the vehicle is moving to the left. Three occupants, including a center occupant 900a, are restrained in a rear-facing seats (not shown). Three more occupants, including another center occupant 900b, are restrained in front-facing seats (not shown). In the shown example, the center occupants 900a, 900b face each other at a central location within the passenger compartment.

Each of the cross-cabin airbags 908a, 908b includes three chambers, two outer chambers 910a or 910b, 914a or 914b and a central chamber 912a or 912b. The outer chambers 910a, 910b, 914a, 914b can have a lower pressure and/or stiffness, and the central chambers 912a, 912b can have a higher pressure and/or stiffness than that of the outer chambers 910a, 910b, 914a, 914b. The cross-cabin airbags 908a, 908b can be mounted on opposing interior surfaces of a passenger compartment of a vehicle (not shown) and deployed in a manner that positions the cross-cabin airbags 908a, 908b between the two rows of occupants. Deployment of the cross-cabin airbags 908a, 908b can be based on a sensor (not shown) sending a controller (not shown) an output signal indicative of an imminent collision. Deployment can be such that the outer chambers 910a, 910b, 914a, 914b extend along side surfaces of the respective central chambers 912a, 912b as shown.

The cross-cabin airbags 908a, 908b can extend or inflate such that outer surfaces of the cross-cabin airbags 908a, 908b meet along an interface region 916 designated in dotted line. In the example of FIG. 9, the central chambers 912a, 912b are designed to meet in a keyed relationship along the interface region 916. Here, the keyed relationship is such that an outer surface of the central chamber 912a defines a depression 922 and an outer surface of the central chamber 912b includes a protrusion 924. The protrusion 924 is fitted within the depression 922 when the central chambers 912a, 912b are deployed as shown. When the outer chambers 910a, 910b, 914a, 914b and the central chambers 912a, 912b meet along the interface region 916 in this keyed manner using the protrusion 924 and the depression 922, it is difficult for the occupants 900a, 900b to press between the cross-cabin airbags 908a, 908b, increasing the efficiency of the occupant safety system. A cross section through FIG. 9 is described in reference to FIGS. 10A, 10B, and 10C below.

FIGS. 10A, 10B, and 10C show cross-sectional examples through the cross-cabin airbags 908a, 908b of FIG. 9. Though described in reference to FIG. 9, the cross-sectional examples of FIGS. 10A, 10B, and 10C can be implemented in a variety of cross-cabin airbags, such as the cross-cabin airbags 408a, 408b, 508a, 508b, 608a, 608b, 708a, 708b, 808a, and 808b of FIGS. 4, 5, 6, 7, and 8. Where FIGS. 4-9 show a top view, FIGS. 10A, 10B, and 10C show sectional views depicting various keyed relationships between cross-cabin airbags 1008a, 1008b consistent with a side view of the deployed cross-cabin airbags 1008a, 1008b.

The keyed relationships of the cross-cabin airbags 1008a, 1008b can be formed using angled faces (FIG. 10A), depressions (FIGS. 10B, 10C), and protrusions (FIGS. 10B, 10C) on outer surfaces of the central chambers in a manner similar to that previously described in reference to FIGS. 7, 8, and 9. Further, keyed relationships can be formed in one or two planes along interface regions, that is, as keyed from a top view as in FIGS. 7, 8, and 9 or as keyed from a sectional or side view as shown in FIGS. 10A, 10B, and 10C. Establishing keyed relationships between the cross-cabin airbags 1008a, 1008b using angled faces, protrusions, and depressions makes it difficult for occupants to press between the cross-cabin airbags 1008a, 1008b, increasing the efficiency of the occupant safety system.

FIG. 11 shows another top-view pre-collision diagram using cross-cabin airbags 1108a, 1108b as part of an occupant safety system for use in an opposed seating system. The front of the vehicle including the opposed seating system is on the left, and the vehicle is moving to the left. Three occupants, including a center occupant 1100a, are restrained in a rear-facing seats (not shown). Three more occupants, including another center occupant 1100b, are restrained in front-facing seats (not shown). In the shown example, the center occupants 1100a, 1100b face each other at a central location within the passenger compartment.

Each of the cross-cabin airbags 1108a, 1108b includes three chambers, two outer chambers 1110a or 1110b, 1114a or 1114b and a central chamber 1112a or 1112b. The outer chambers 1110a, 1110b, 1114a, 1114b can have a lower pressure and/or stiffness, and the central chambers 1112a, 1112b can have a higher pressure and/or stiffness than that of the outer chambers 1110a, 1110b, 1114a, 1114b. The cross-cabin airbags 1108a, 1108b can be mounted on opposing interior surfaces of a passenger compartment of a vehicle (not shown) and deployed in a manner that positions the cross-cabin airbags 1108a, 1108b between the two rows of occupants. Deployment of the cross-cabin airbags 1108a, 1108b can be based on a sensor (not shown) sending a controller (not shown) an output signal indicative of an imminent collision. Deployment can be such that the outer chambers 1110a, 1110b, 1114a, 1114b extend along side surfaces of the respective central chambers 1112a, 1112b as shown.

The cross-cabin airbags 1108a, 1108b can extend or inflate such that outer surfaces of the cross-cabin airbags 1108a, 1108b meet along an interface region 1116 designated in dotted line. In the example of FIG. 11, the central chambers 1112a, 1112b are designed to meet in a keyed relationship along the interface region 1116. Here, the keyed relationship is such that an outer surface of the central chamber 1112a defines a depression 1122. The depression 1122 serves as the female portion of the keyed relationship. The outer surface of the central chamber 1112b includes a protrusion 1124 or male portion of the keyed relationship.

The protrusion 1124 extending from the central chamber 1112b is shown in dotted line since the protrusion 1124 is inflated after main bodies of the central chambers 1112a, 1112b are inflated so as to be fitted within the depression 1122 in a locking manner as shown. When the outer chambers 1110a, 110b, 1114a, 1114b and the central chambers 1112a, 1112b meet along the interface region 1116 in this keyed manner using the protrusion 1124 and the depression 1122, it is difficult for the occupants 1100a, 1100b to press between the cross-cabin airbags 1108a, 1108b, increasing the efficiency of the occupant safety system.

Figure 12:
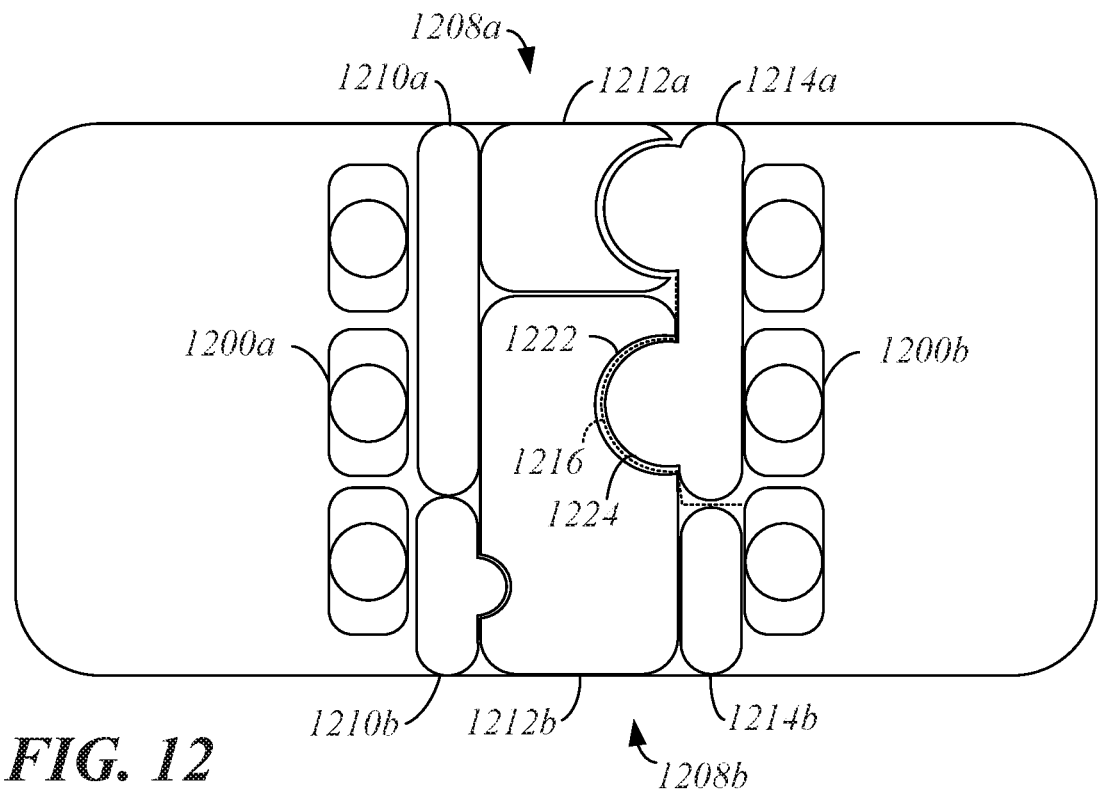
FIG. 12 shows another top-view pre-collision diagram using cross-cabin airbags as part of an occupant safety system for use in an opposed seating system.

FIG. 12 shows another top-view pre-collision diagram using cross-cabin airbags 1208a, 1208b as part of an occupant safety system for use in an opposed seating system. The front of the vehicle including the opposed seating system is on the left, and the vehicle is moving to the left. Three occupants, including a center occupant 1200a, are restrained in a rear-facing seats (not shown). Three more occupants, including another center occupant 1200b, are restrained in front-facing seats (not shown). In the shown example, the center occupants 1200a, 1200b face each other at a central location within the passenger compartment.

Each of the cross-cabin airbags 1208a, 1208b includes three chambers, two outer chambers 1210a or 1210b, 1214a or 1214b and a central chamber 1212a or 1212b. The outer chambers 1210a, 1210b, 1214a, 1214b can have a lower pressure and/or stiffness, and the central chambers 1212a, 1212b can have a higher pressure and/or stiffness than that of the outer chambers 1210a, 1210b, 1214a, 1214b. The cross-cabin airbags 1208a, 1208b can be mounted on opposing interior surfaces of a passenger compartment of a vehicle (not shown) and deployed in a manner that positions the cross-cabin airbags 1208a, 1208b between the two rows of occupants. Deployment of the cross-cabin airbags 1208a, 1208b can be based on a sensor (not shown) sending a controller (not shown) an output signal indicative of an imminent collision. Deployment can be such that the outer chambers 1210a, 1210b, 1214a, 1214b extend along side surfaces of the respective central chambers 1212a, 1212b as shown.

The cross-cabin airbags 1208a, 1208b can extend or inflate such that outer surfaces of the cross-cabin airbags 1208a, 1208b meet along an interface region 1216 designated in dotted line. In the example of FIG. 12, the outer chamber 1214a meets the central chamber 1212b in a keyed relationship along the interface region 1216. Here, the keyed relationship is such that an outer surface of the central chamber 1212b defines a depression 1222 and an outer surface of the outer chamber 1214a includes a protrusion 1224. The protrusion 1224 is fitted within the depression 1222 when the cross-cabin airbags 1208a, 1208b are deployed as shown. The outer chambers 1210b, 1214a also include protrusions allowing a tighter fit to respective side surfaces of the central chambers 1212a, 1212b as shown. When the outer chambers 1210a, 1210b, 1214a, 1214b and the central chambers 1212a, 1212b meet along the interface region 1216 in this keyed manner using the protrusion 1224 and the depression 1222, it is difficult for the occupants 1200a, 1200b to press between the cross-cabin airbags 1208a, 1208b, increasing the efficiency of the occupant safety system.

Figure 13:
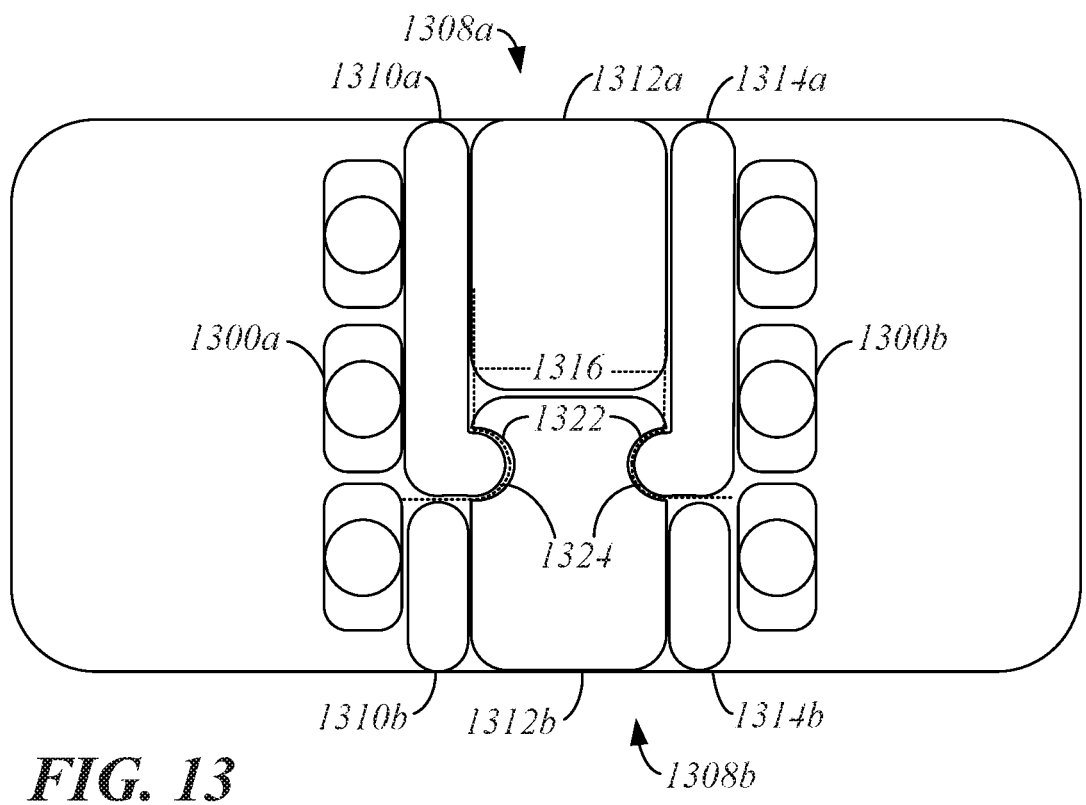
FIG. 13 shows another top-view pre-collision diagram using cross-cabin airbags as part of an occupant safety system for use in an opposed seating system.

FIG. 13 shows another top-view pre-collision diagram using cross-cabin airbags 1308a, 1308b as part of an occupant safety system for use in an opposed seating system. The front of the vehicle including the opposed seating system is on the left, and the vehicle is moving to the left. Three occupants, including a center occupant 1300a, are restrained in a rear-facing seats (not shown). Three more occupants, including another center occupant 1300b, are restrained in front-facing seats (not shown). In the shown example, the center occupants 1300a, 1300b face each other at a central location within the passenger compartment.

Each of the cross-cabin airbags 1308a, 1308b includes three chambers, two outer chambers 1310a or 1310b, 1314a or 1314b and a central chamber 1312a or 1312b. The outer chambers 1310a, 1310b, 1314a, 1314b can have a lower pressure and/or stiffness, and the central chambers 1312a, 1312b can have a higher pressure and/or stiffness than that of the outer chambers 1310a, 1310b, 1314a, 1314b. In the example of FIG. 13, the central chamber 1312a has a volume approximately half of a volume of the central chamber 1312b such that an outermost portion of an outer surface of the central chamber 1312a can touch or otherwise interface with an outermost portion of an outer surface of the central chamber 1312b at a location offset from a center of the passenger compartment in a first direction. The outer chambers 1310b, 1314b can have volumes approximately half of volumes of the outer chambers 1310a, 1314a such that outermost portions of outer surfaces of the outer chambers 1310b, 1314b can touch or otherwise interface with outermost portions of outer surfaces of the outer chambers 1310a, 1314a at a location offset from a center of the passenger compartment in a second direction.

The cross-cabin airbags 1308a, 1308b can be mounted on opposing interior surfaces of a passenger compartment of a vehicle (not shown) and deployed in a manner that positions the cross-cabin airbags 1308a, 1308b between the two rows of occupants. Deployment of the cross-cabin airbags 1308a, 1308b can be based on a sensor (not shown) sending a controller (not shown) an output signal indicative of an imminent collision. Deployment can be such that the outer chambers 1310a, 1310b, 1314a, 1314b extend along side surfaces of the respective central chambers 1312a, 1312b as shown.

The cross-cabin airbags 1308a, 1308b can extend or inflate such that outer surfaces of the cross-cabin airbags 1308a, 1308b meet along an interface region 1316 designated in dotted line. In the example of FIG. 13, the outer chambers 1310a, 1314a meet the central chamber 1312b in a keyed relationship along the interface region 1316. Here, the keyed relationship is such that an outer surface of the central chamber 1312b defines a pair of depressions 1322 and outer surfaces of the outer chambers 1310a, 1314a include protrusions 1324. The protrusions 1324 fit within the depressions 1322 when the cross-cabin airbags 1308a, 1308b are deployed as shown. When the outer chambers 1310a, 1310b, 1314a, 1314b and the central chambers 1312a, 1312b meet along the interface region 1316 in this keyed manner using the protrusions 1324 and the depressions 1322, it is difficult for the occupants 1300*a*, 1300*b* to press between the cross-cabin airbags 1308*a*, 1308*b*, increasing the efficiency of the occupant safety system.

Figure 14C:
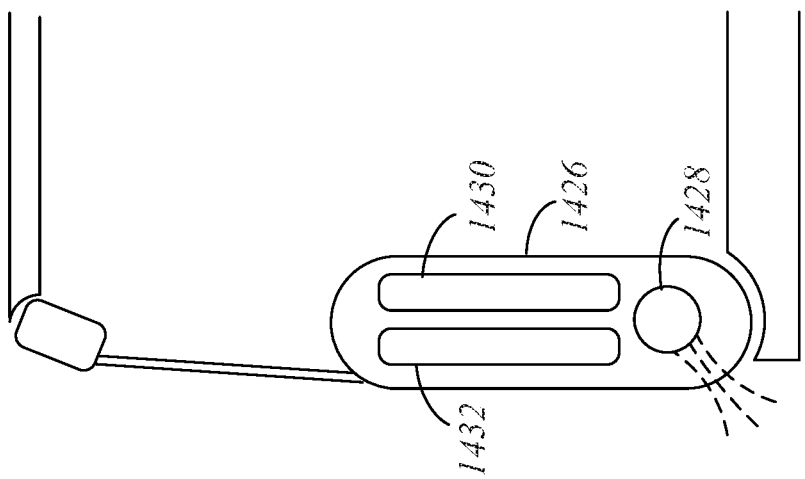
FIGS. 14A, 14B, and 14C show partial cross sections through a passenger compartment with an airbag system disposed within a door of a vehicle.
Figure 14B:
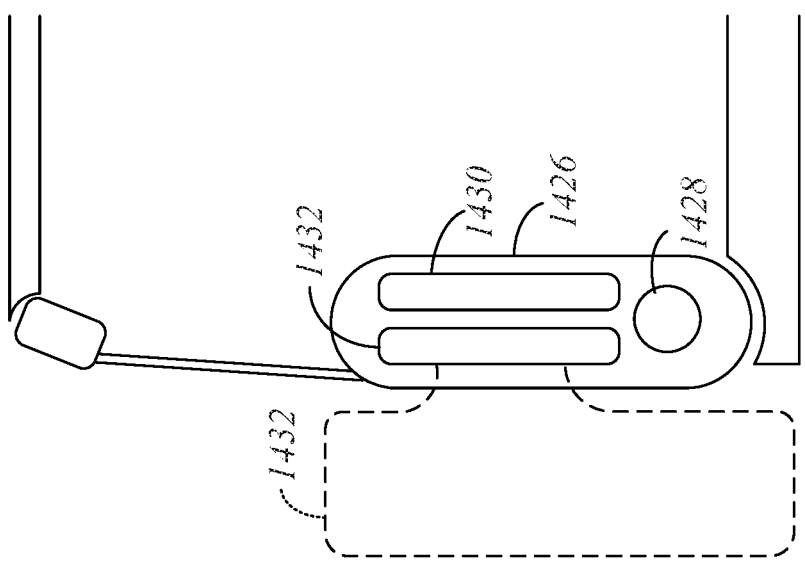
Figure 14A:
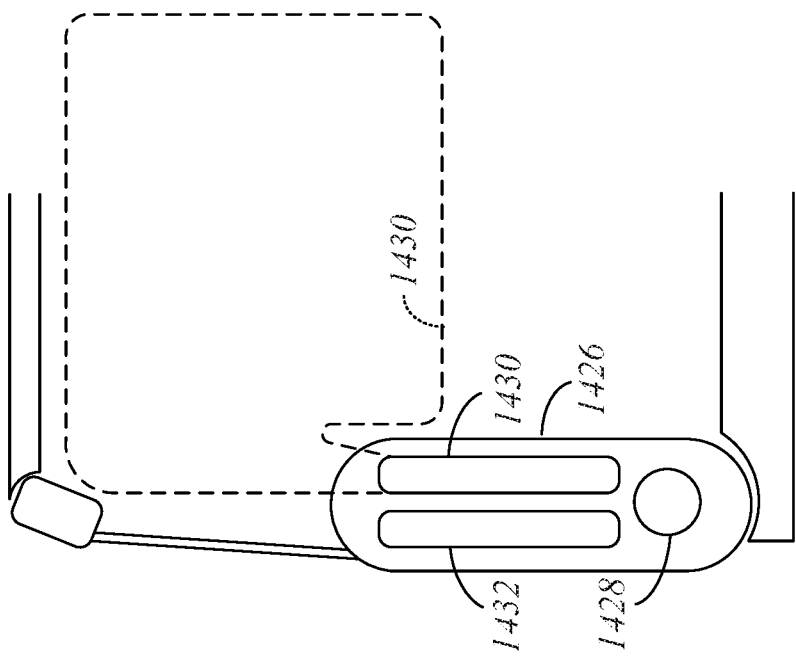

FIGS. 14A, 14B, and 14C show partial cross sections through a passenger compartment with an airbag system disposed within a door 1426 of a vehicle. The airbag system includes an inflator 1428, an interior airbag 1430, and an exterior airbag 1432. Packaging the airbag system within a roof rail, along a belt line, or in any other location inclusive of a vehicle crush zone where the inflator 1428 may sustain damage, for example, during a collision, is also possible.

The inflator 1428 can be designed to selectively inflate the interior airbag 1430 as shown in dotted line in FIG. 14A, inflate the exterior airbag 1432 as shown in dotted line in FIG. 14B, or vent the inflator 1428 as shown in dotted line in FIG. 14C. Selective inflation and venting can be based on one or more sensors (not shown) sending a controller (not shown) an output signal indicative of an imminent collision. The output signal can include location information indicating an anticipated location on the vehicle of the imminent collision. For example, location information can identify an anticipated front-end collision, rear-end collision, side collision, or corner collision. The output signal can also include vehicle information such as vehicle speed, vehicle mass, and time-to-collision.

In a case where the location information indicates a front-end collision or rear-end collision, the inflator 1428 can be controlled to deploy the interior airbag 1430. In a case where the location information indicates a side collision, the inflator 1428 can be controlled to deploy the interior airbag 1430, deploy the exterior airbag 1432, or vent the inflator 1428 depending on available vehicle information from one or more sensors (not shown). In a case where the location information indicates a corner collision, the inflator 1428 can be controlled to deploy the interior airbag 1430 or vent the inflator 1428 depending on vehicle information. Venting the inflator 1428 protects against pressure-based damage caused, for example, by an impact against the inflator 1428 which may occur in side collisions or corner collisions.

Figure 15:
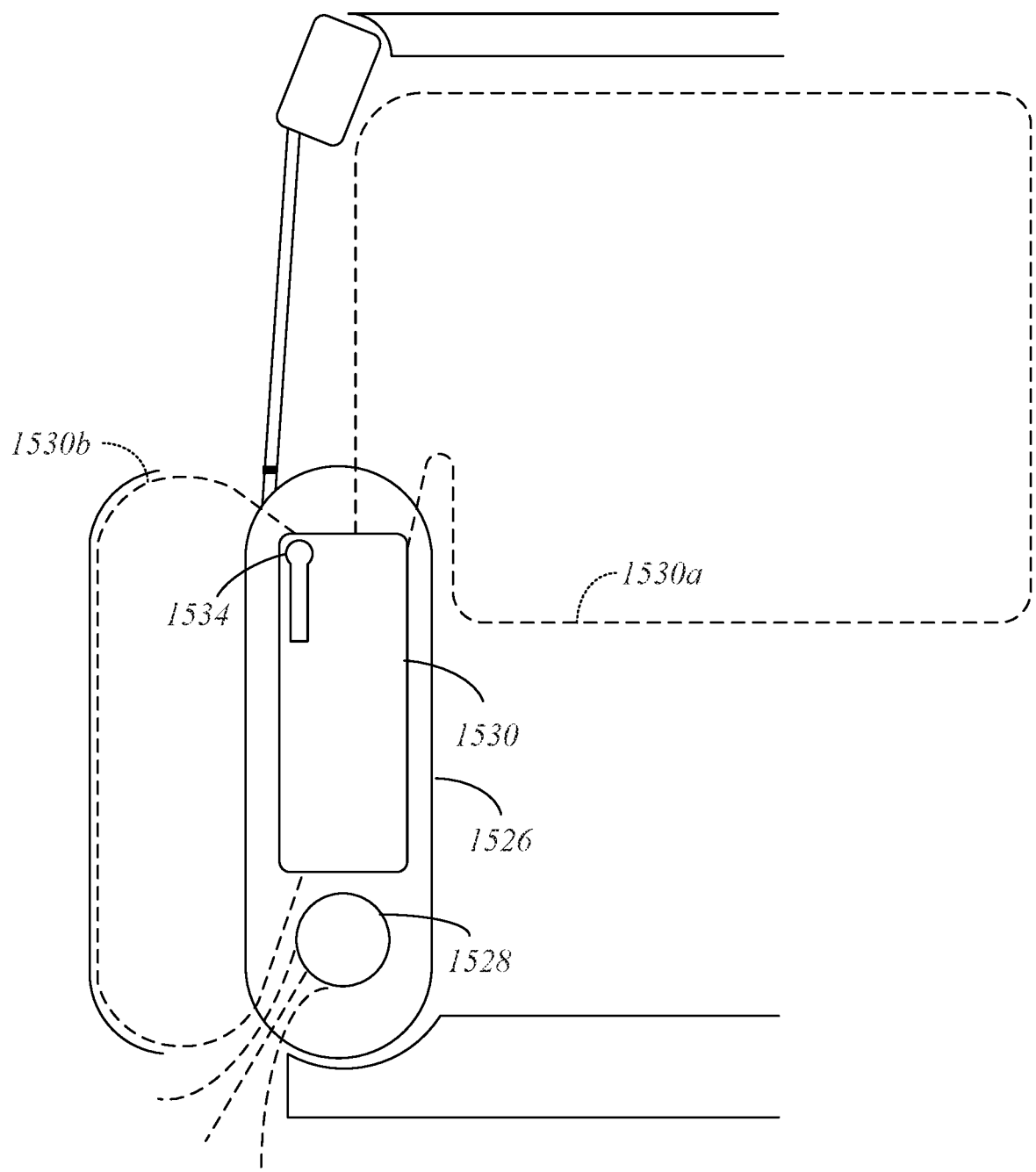
FIG. 15 shows another partial cross section through a passenger compartment with an airbag system disposed within a door of a vehicle.

FIG. 15 shows another partial cross section through a passenger compartment with an airbag system disposed within a door 1526 of a vehicle. The airbag system includes an inflator 1528, an airbag 1530, and a chute switch 1534. Packaging the airbag system within a roof rail, along a belt line, or in any other location inclusive of a vehicle crush zone where the inflator 1528 may sustain damage, for example, during a collision, is also possible.

The chute switch 1534 can be used to selectively direct inflation of the airbag 1530 into an interior of the vehicle as shown by dotted line representation with airbag 1530*a* or outside the exterior of the vehicle as shown by dotted line representation with airbag 1530*b*, for example, based on the output signal. The chute switch 1534 can have a first position (shown) where an opening in an interior panel of the door 1526 allows the airbag 1530*a* to expand inside the vehicle as shown in dotted line. The chute switch 1534 can have a second position (not shown) where an exterior of the door 1526 is spaced apart from the vehicle and the airbag 1530*b* expands outside the vehicle as shown in dotted line. Various mechanisms can be used to implement the chute switch 1534 and openings in panels of the door 1526 such that they properly direct inflation of the airbag 1530 toward the inside of the vehicle or the outside of the vehicle dependent upon information describing an actual or imminent collision.

The inflator 1528 can be designed to selectively inflate the airbag 1530 or vent the inflator 1528 in conjunction with the chute switch 1534. Selective inflation and venting can be based on one or more sensors (not shown) sending a controller (not shown) an output signal indicative of an imminent collision. The output signal can include location information indicating an anticipated location on the vehicle of the imminent collision. For example, location information can identify an anticipated front-end collision, rear-end collision, side collision, or corner collision. The output signal can also include vehicle information such as vehicle speed, vehicle mass, and time-to-collision.

In a case where the location information indicates a front-end collision or rear-end collision, the inflator 1528 and the chute switch 1534 can be controlled to direct the airbag 1530*a* to deploy into the interior of the vehicle. In a case where the location information indicates a side collision, the inflator 1528 and the chute switch 1534 can be controlled to direct the airbag 1530*a* to deploy into the interior of the vehicle, direct the airbag 1530*b* to deploy outside the vehicle, or vent the inflator 1528 depending on available vehicle information from one or more sensors (not shown). In a case where the location information indicates a corner collision, the inflator 1528 and the chute switch 1534 can be controlled to direct the airbag 1530*a* to deploy on the interior of the vehicle or to vent the inflator 1528 depending on vehicle information. Venting the inflator 1528 protects against pressure-based damage caused, for example, by an impact against the inflator 1528 which may occur in side collisions or corner collisions.

Figure 16:
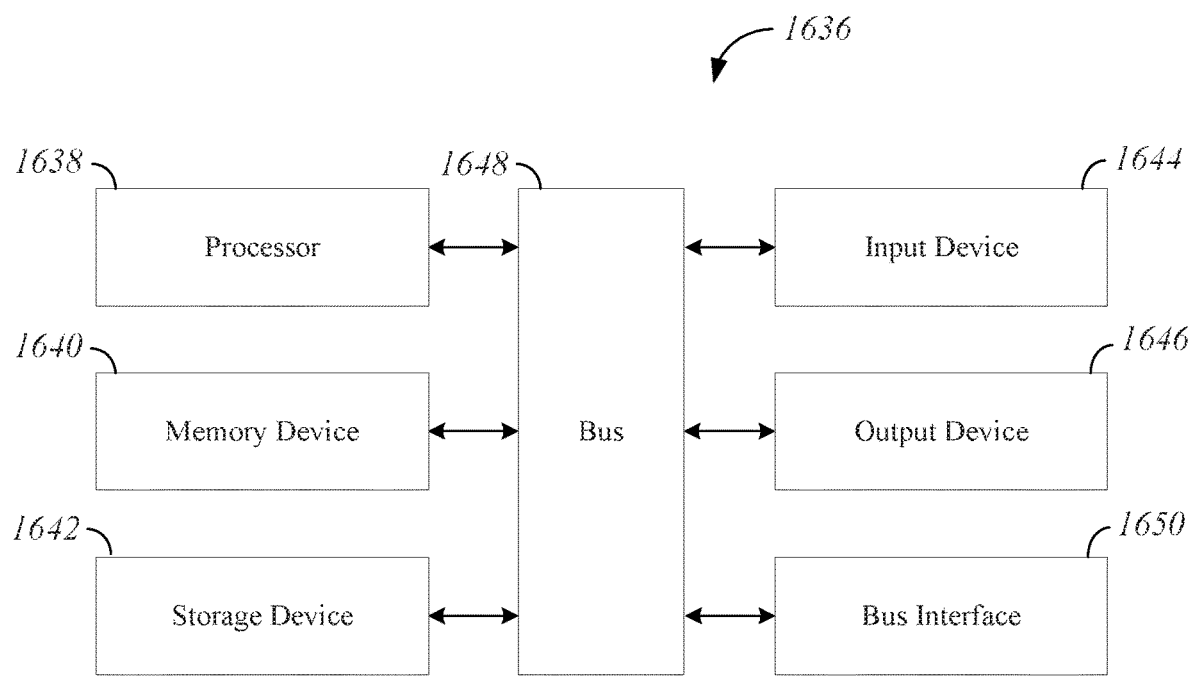
FIG. 16 is a block diagram of an example of a computing device.

FIG. 16 is a block diagram of an example of a computing device 1636. The computing device 1636 can be a single computing device or a system that includes multiple computing devices working cooperatively. As an example, the computing device 1636 can be a vehicle-based computing device such a control unit or a vehicle ECU. Alternatively, the computing device 1636 can be a desktop computer, a laptop computer, a tablet, or a mobile device such as a smart phone.

In the example where the computing device 1636 is a control unit, the control unit can be operable to send commands to various components of the safety systems in the above-described embodiments. For example, the control unit can send commands to the inflators 1428, 1528 in order to cause deployment of the airbags 1430, 1432, 1530. That is, the control unit can send commands to implement various safety measures in the various occupant safety systems described herein.

In the illustrated example of FIG. 16, the computing device 1636 includes a processor 1638, a memory device 1640, a storage device 1642, one or more input devices 1644, and one or more output devices 1646 which are interconnected by a bus 1648. The computing device 1636 can also include a bus interface 1650 for connecting peripheral devices to the bus 1648.

The processor 1638 can be any type of device that is able to process or manipulate information, including devices that are currently known and devices that may be developed in the future. As an example, the processor 1638 can be a conventional central processing unit (CPU). Although the illustrated example shows a single processor, multiple processors can be used instead of a single processor.

The memory device 1640 can be used to store information for immediate use by the processor 1638. The memory device 1640 includes either or both of a random access memory (RAM) device and a read only memory (ROM) device. The memory device 1640 can be used to store information, such as program instructions that can be executed by the processor 1638, and data that is stored by and retrieved by the processor 1638. In addition, portions of the operating system of the computing device 1636 and other applications that are being executed by the computing device 1636 can be stored by the memory device during operation of the computing device 1636.

The storage device 1642 can be used to store large amounts of data persistently. As examples, the storage device 1642 can be a hard disk drive or a solid state drive.

The input devices 1644 can include any type of device that is operable to generate computer interpretable signals or data in response to user interaction with the computing device 1636, such as physical interaction, verbal interaction, or non-contacting gestural interaction. As examples, the input devices 1644 can include one or more of a keyboard, a mouse, a touch-sensitive panel with or without an associated display, a trackball, a stylus, a microphone, a camera, or a three-dimensional motion capture device.

The output devices 1646 can include any type of device that is able to relay information in a manner that can be perceived by a user. As examples, the output devices 1646 can include one or more of an LCD display screen, an LED display screen, a CRT display screen, a printer, an audio output device such as a speaker, or a haptic output device. In some implementations, the output devices 1646 include a display screen and the input devices 1644 include a touch sensitive panel that is integrated into the display screen to define a touch-sensitive display screen.

The bus 1648 transfers signals and/or data between the components of the computing device 1636. Although depicted as a single bus, it should be understood that multiple or varying types of buses can be used to interconnect the components of the computing device 1636. The bus interface 1650 can be any type of device that allows other devices, whether internal or external, to connect to the bus 1648. In one implementation, the bus interface 1650 allows connection to a controller area network (CAN) bus of a vehicle.

What is claimed is:

1. An occupant safety system, comprising:
   a sensor that provides an output signal indicative of an imminent collision; and
   first and second inflatable restraints configured to:
      deploy from opposing interior surfaces of a passenger compartment of a vehicle based on the output signal; and
      meet at an interface region in a central location within the passenger compartment upon deployment,
   wherein a first outer surface of the first inflatable restraint meets a second outer surface of the second inflatable restraint in a keyed relationship along the interface region,
   wherein the keyed relationship includes a protrusion on the first outer surface fitted within a depression disposed in the second outer surface, and
   wherein inflation of the protrusion occurs after inflation of a main body of the first inflatable restraint.

2. The system of claim 1, wherein the keyed relationship includes an angled face on the first outer surface fitted to another angled face on the second outer surface.

3. The system of claim 1, wherein the opposing interior surfaces of the passenger compartment are proximate to at least one of doors, roof rails, or belt lines.

4. The system of claim 1, further comprising:
   a coating deposited on at least one of the first and second outer surfaces, the coating increasing a coefficient of friction along the interface region.

5. The system of claim 1, wherein the first and second inflatable restraints each comprise:
   a first chamber of a first pressure; and
   a second chamber of a second pressure that extends along a side surface of the first chamber upon deployment, wherein the first pressure is at least two times the second pressure.

6. The system of claim 1, wherein the protrusion includes an end having a rounded shape.

7. The system of claim 1, wherein the first outer surface of the first inflatable restraint overlaps the second outer surface of the second inflatable restraint along the interface region.

8. An occupant safety system, comprising:
   a sensor that provides an output signal indicative of an imminent collision;
   a first inflatable restraint that deploys from a first interior surface of a passenger vehicle in response to the output signal;
   a second inflatable restraint that deploys from a second interior surface of the passenger vehicle in response to the output signal, the first and second interior surfaces of the passenger vehicle being opposing interior surfaces proximate to at least one of doors, roof rails, or belt lines; and
   an interface structure comprising a protrusion of the first inflatable restraint configured to fit within a depression of the second inflatable restraint and configured to restrain motion of the first inflatable restraint relative to the second inflatable restraint when the first inflatable restraint and the second inflatable restraint are deployed,
   wherein inflation of the protrusion occurs after inflation of a main body of the first inflatable restraint.

9. The system of claim 8, wherein the interface structure includes overlapping outer surfaces of the first and second inflatable restraints.

10. The system of claim 9, wherein the interface structure includes a coating that increases friction between the overlapping outer surfaces of the first inflatable restraint and the second inflatable restraint when the first inflatable restraint and the second inflatable restraint are deployed.

11. The system of claim 8, wherein an angled face on the first inflatable restraint is fitted to an opposing angled face of the second inflatable restraint.

12. The system of claim 8, wherein the first inflatable restraint and the second inflatable restraint each include a first chamber having a first stiffness and a second chamber having a second stiffness that is lower than the first stiffness when the first inflatable restraint and the second inflatable restraint are deployed.

13. The system of claim 8, wherein the protrusion includes an end having a rounded shape.

14. An occupant safety system, comprising:
   a sensor that provides an output signal indicative of an imminent collision; and
   first and second inflatable restraints each comprising first chambers of a first pressure and second chambers of a second pressure that extend along side surfaces of the first chambers upon deployment,
   wherein the first pressure is at least two times the second pressure,
   wherein the first and second inflatable restraints deploy from opposing interior surfaces of a passenger compartment of a vehicle based on the output signal, and wherein the first and second inflatable restraints meet at an interface region within the passenger compartment upon deployment.

15. The system of claim 14, further comprising:

an interface structure configured to restrain motion of the first inflatable restraint relative to the second inflatable restraint when the first inflatable restraint and the second inflatable restraint are deployed.

16. The system of claim 15, wherein the interface structure includes a protrusion on the first chamber of the first inflatable restraint that is fitted within a depression disposed in the first chamber of the second inflatable restraint when the first inflatable restraint and the second inflatable restraint are deployed.

17. The system of claim 16, wherein inflation of the protrusion occurs after inflation of a main body of the first inflatable restraint.

18. The system of claim 16, wherein the protrusion includes an end having a rounded shape.

19. The system of claim 15, wherein the interface structure includes an angled face on the first inflatable restraint that is fitted to an opposing angled face of the second inflatable restraint when the first inflatable restraint and the second inflatable restraint are deployed.

20. The system of claim 15, wherein the interface structure includes overlapping outer surfaces of the first and second inflatable restraints.

* * * * *